April 7, 1925.                                                                1,532,500
G. S. KILBOURN
PROCESS FOR THE TREATMENT OF MAGNESITE OR DOLOMITE
Filed Feb. 6, 1923
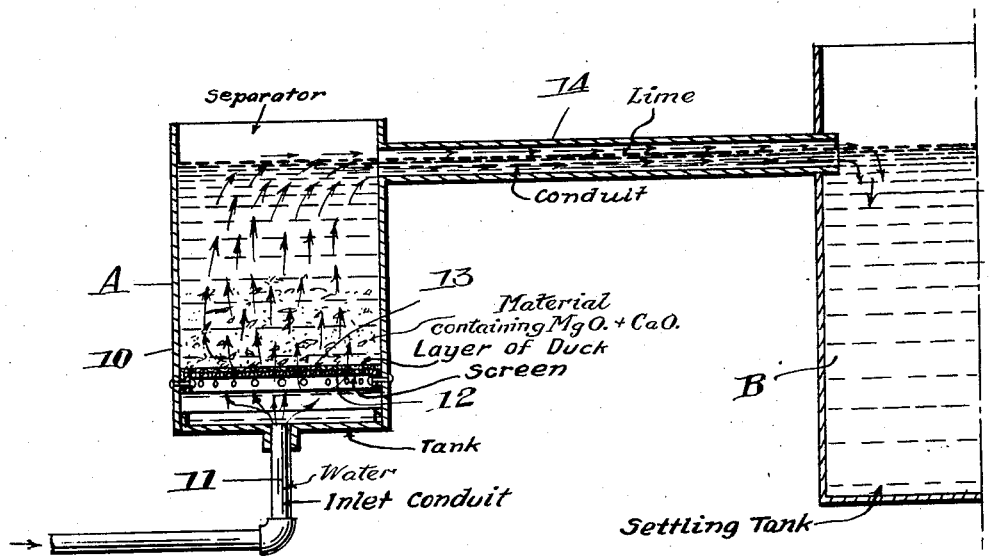
INVENTOR
GEORGE. S. KILBOURN.
BY
ATTYS.

Patented Apr. 7, 1925.

1,532,500

UNITED STATES PATENT OFFICE.

GEORGE STIRKE KILBOURN, OF OWEN SOUND, ONTARIO, CANADA.

PROCESS FOR THE TREATMENT OF MAGNESITE OR DOLOMITE.

Application filed February 6, 1923. Serial No. 617,378.

*To all whom it may concern:*

Be it known that I, GEORGE STIRKE KILBOURN, a subject of the King of Great Britain, and a resident of Owen Sound, in the Province of Ontario and Dominion of Canada, have invented certain new and useful Improvements in Processes for the Treatment of Magnesite or Dolomite, of which the following is a specification.

This invention relates to methods for removing all or part of the lime from magnesite or dolomite, or mixtures of magnesite and dolomite, with the object of getting rid of any excess lime whereby the residue of the product will have a higher commercial value, and the lime may be available as a by-product.

More particular objects of the invention are to provide for the recovery of either or both of two separate materials, one being in the nature of calcined magnesite suitable for the manufacture of dead-burned magnesite for refractory purposes, or for the manufacture of Sorel cement or oxy-chloride cement, stucco, flooring, plaster, Epsom salts, magnesium chloride and other commercial purposes; the other product being principally lime.

Further objects still are generally to improve and simplify the process to enable the various steps and the entire process to be performed with a maximum efficiency, and the greatest possible recovery of valuable commercial products.

The process of manufacture consists in calcining the raw magnesite rock, or dolomite rock, and then slaking the calcined material with water, with or without the application of heat, and then separating the lime by hydraulic means, as hereinafter exemplified in the accompanying specification and drawings.

The drawings show a secional elevation of one form of separator and settling tank which may be used in carrying out the process.

In carrying out the process, the raw magnesite rock, or dolomite rock, are calcined either together or separately, and the calcined material is then slaked by adding water either hot or cold to the material which may be either hot or cold, agitating the mixture and allowing it to settle. Then treating it with a stream of water introduced through the bottom of the vessel containing the mixture and designed to pass, before reaching the mixture, through a fine mesh screen and a layer of porous material, whereby the stream of water is evenly distributed throughout the entire bottom of the tank, thereby causing the lime to float to a settling tank and causing the magnesia to remain as a deposit.

It will be found that in the ordinary practice of the invention, the proportion of water to material may be about fifty per cent by weight, but, by careful conditions of operation, the water required for operation may be reduced below this amount.

I have shown for this purpose a separator A comprising a tank 10 having an inlet conduit 11, and a screen 12 near the bottom covered by a layer 13 of duck or other suitable material. The material to be treated is placed above the screen 12 and duck 13, and a stream of water is caused to pass through the screen and duck, being introduced under suitable pressure through the inlet conduit 11. This water rising through the material in the separator will float the lime upwardly, and separate it from the magnesia. The lime floating in the stream may pass through the lateral conduit 14 to a suitable settling tank B, from which from time to time the material is withdrawn and dried, and then used for various purposes in the arts. The magnesia residue in the separator A, will also be removed and dried from time to time.

It may be observed that the process is designed for the extraction of material either from magnesite or from dolomite or from a mixture of these substances either wholly or partly calcined.

The residue after the lime is separated from the other material may be used for the manufacture of Sorel cement and the like, stucco, flooring, plaster, Epsom salts, magnesium chloride, refractory materials, and other commercial purposes.

As many changes could be made in the above process and many apparently widely different embodiments of my invention within the scope of the claims, without departing from the spirit or scope thereof, it is intended that all matter contained in the accompanying specification and drawings shall be interpreted as illustrative and not in a limiting sense.

What I claim as my invention is:

1. The herein described process for the extraction of lime from materials containing magnesium and calcium carbonates, which consists in first calcining the material to be treated, slaking the same, then allowing it to settle in a suitable vessel and subjecting it to the action of a stream of water introduced therebeneath through a screen of substantially 200 mesh, covered with a layer of porous material, whereby the lime is floated off and the magnesia remains.

2. The herein described process for the extraction of lime from materials containing magnesium and calcium carbonates, which consists in first calcining the material to be treated, slaking the same, then allowing it to settle in a suitable tank and subjecting it to the action of a stream of water introduced therebeneath through suitable screening means, whereby the stream of water is evenly distributed throughout the entire body of the material and whereby the lime is floated to a settling tank and the magnesia remains.

3. The herein described process for the extraction of lime from materials containing magnesium and calcium carbonates, which consists in calcining the material to be treated, slaking it, then allowing it to settle in a suitable tank and subjecting it to the action of a stream of water introduced therebeneath and evenly distributed throughout the entire body of the material, whereby the lime is floated to a settling tank and the magnesia remains.

In witness whereof I have hereunto set my hand.

GEORGE STIRKE KILBOURN.